US012148274B2

(12) United States Patent
Evans

(10) Patent No.: US 12,148,274 B2
(45) Date of Patent: Nov. 19, 2024

(54) TAMPER ALERT SYSTEM

(71) Applicant: THE SENTRY DEVICES LTD, Kent (GB)

(72) Inventor: Stuart Alexander John Evans, Kent (GB)

( * ) Notice: Subject to any disclaimer, the term of this patent is extended or adjusted under 35 U.S.C. 154(b) by 0 days.

(21) Appl. No.: 17/914,580

(22) PCT Filed: May 14, 2021

(86) PCT No.: PCT/IB2021/054148
§ 371 (c)(1),
(2) Date: Sep. 26, 2022

(87) PCT Pub. No.: WO2021/229524
PCT Pub. Date: Nov. 18, 2021

(65) Prior Publication Data

US 2023/0306830 A1 Sep. 28, 2023

(30) Foreign Application Priority Data

May 14, 2020 (GB) ..................................... 2007156

(51) Int. Cl.
*G08B 13/14* (2006.01)

(52) U.S. Cl.
CPC ..... *G08B 13/1445* (2013.01); *G08B 13/1427* (2013.01)

(58) Field of Classification Search
CPC ............ G08B 13/1445; G08B 13/1427; G06F 1/1632; G06F 1/1654; G06F 1/1683
See application file for complete search history.

(56) References Cited

U.S. PATENT DOCUMENTS

| | | | |
|---|---|---|---|
| 7,986,225 B1 | 7/2011 | Edelstein et al. | |
| 10,540,872 B2 * | 1/2020 | Blaser | B60R 25/24 |
| 10,776,473 B2 * | 9/2020 | Blaser | G08B 13/2434 |
| 11,195,392 B2 * | 12/2021 | Blaser | B60R 25/1003 |
| 11,315,398 B2 * | 4/2022 | Blaser | B60R 25/1003 |
| 2002/0188866 A1 | 12/2002 | Ca et al. | |
| 2014/0292526 A1 | 10/2014 | Hansson et al. | |
| 2016/0155134 A1 | 6/2016 | Mayer et al. | |
| 2017/0337778 A1 | 11/2017 | Shuster et al. | |

(Continued)

FOREIGN PATENT DOCUMENTS

| | | |
|---|---|---|
| CN | 103051787 A | 4/2013 |
| JP | 2010-140388 A | 6/2010 |

(Continued)

*Primary Examiner* — Hoi C Lau
(74) *Attorney, Agent, or Firm* — William H. Bollman

(57) ABSTRACT

The present invention relates to system for raising an alarm if an electronic device is stolen. The tamper alert system for an electronic device comprises: a cable with a plug for connecting to a terminal of the device which has a processor; a sensor that is operable to communicate with the processor in the device and in accordance with computer implemented software.

When an authorised connection of the cable is made to the electrical device a signal is received by the processor which configures an alarm to a standby mode. When in standby mode, if the sensor senses an unauthorised disconnection of the cable from the device, the processor transmits an alert signal, indicating an unauthorised event, to the alarm which activates the alarm.

20 Claims, 13 Drawing Sheets

(56) References Cited

U.S. PATENT DOCUMENTS

| | | | | |
|---|---|---|---|---|
| 2018/0108231 | A1* | 4/2018 | Leyden | G08B 25/10 |
| 2018/0286195 | A1* | 10/2018 | Baker | G08B 25/008 |
| 2018/0336778 | A1 | 11/2018 | Lueken | |
| 2023/0306830 | A1* | 9/2023 | Evans | G08B 13/181 |

FOREIGN PATENT DOCUMENTS

| | | | |
|---|---|---|---|
| KR | 20160148188 | A | 12/2016 |
| WO | 2018227076 | A1 | 12/2018 |

* cited by examiner

TAMPER ALERT SYSTEM

FIELD OF THE INVENTION

The present invention relates to a tamper alert system that detects an unauthorised disconnection of an electronic device from a cable or unauthorised disconnection or severing of a cable from a device. In particular, the invention relates to a system to alert a user when an electronic device is tampered with or stolen.

BACKGROUND

Many people use portable electronic devices, such as smartphones, that often have significant value and contain large amounts of personal and private data, such as photographs and emails. Therefore it is particularly undesirable for these devices to be stolen.

Insurance is available to cover the cost to replace a loss of such portable electronic devices, but the insurance premium incurs additional costs for owners and does not prevent misuse or the loss of the personal and private data.

Tracking systems are available to locate a lost mobile communication device, such as smart phones and tablets. However, these tracking systems can be circumvented when a device is reset. Therefore such tracking systems may not be a sufficient deterrent to stop any attempt to steal such electronic devices.

The present invention provides a secure means of monitoring an electronic device in real time and automatically activating an alarm in the event of an unauthorised disconnection of the device from a cable, or when interruption of a signal from the cable is detected.

A number of anti-tamper devices for use with electronic or smart devices have been proposed.

PRIOR ART

International patent application WO 2018 227 076 (GEYER et al) discloses a method of detecting an event at a wearable mobile device, gene rating an alert in response to the event, and transmitting the alert over a communication path that comprises a cellular network.

Korean patent application KR 2016 0 148 188 (HAN) relates to a method of locking an in cable control box (ICCB) cable or charging cable of a mobile telephone for the prevention of robbery while being charged.

Japanese patent application JP 2010 140 388 (SUGIYAMA) discloses a theft prevention system that prevents a cellular telephone connected to a USB cable, including a power supply line for feeding the power and a signal line, that transmits a data signal if it is stolen.

United States patent US 2014/0292526 (HANSSON et al) discloses a mobile device with a memory, a socket and a controller. The socket is configured to receive a plug, and the controller is configured to detect when a plug is received in the socket and to detect if the plug is removed from the socket and to activate an alarm.

United States patent application US 2018/0336778 (LUEKEN) discloses an arrangement for triggering at least one alarm having at least one mobile data device with an interface for transmitting data to at least one other device, and software is stored on the data device. The software monitors signals emanating from the interface when the device is disconnected from the interface.

United States patent application US 2017/0337778 (MAYER et al) discloses a method and system that enables communication between members of a social group using machines belonging to the system.

States patent application US 2002/0188866 (CA et al) discloses a method and apparatus for detecting the rem oval of a device connected to a network which generates an alarm on a protected device when an unauthorised user disconnects the device from a network connection.

Chinese patent application CN 103051787 (WANG et al) discloses a mobile terminal comprising an anti-theft unit which determines when an earphone is unplugged from the mobile terminal.

The present invention arose in order to overcome problems suffered by existing anti-tamper devices and the ft deterrent devices.

SUMMARY OF THE INVENTION

According to a first aspect of the present invention there is provided a tamper alert system for an electronic device comprising: a cable with a plug for connecting to a terminal of the electronic device and a transmitter is connected to the cable, the transmitter is operative to send a signal to a receiver in the device, the receiver communicates with a processor in the device and in accordance with computer implemented software, the processor determines when an authorised connection of the plug is made to the terminal and configures an alarm to a stand by mode in response thereto; whereby when the alarm is in standby mode and when the sensor senses an unauthorised interruption of the signal from the transmitter, the processor transmits an alert signal, indicating an unauthorised event, to activate an alarm, characterised in that the transmitter is a wireless transmitter.

The cable is connected to or ideally integrally formed with, the wireless transmitter which, when the plug is inserted into the device, is configured to transmit a signal to the sensor to confirm connection of the cable to the electronic device and configure the alarm to standby mode. Ideally the wireless transmitter sends a regular, repeated signal ('ping and ring'). By doing this the electronic device is paired with the tamper alert system. For example, a wireless signal may be transmitted every second or few seconds.

The receipt of such a repeated wireless signal also serves to maintain the processor in an active state and therefore prevents automatic shutdown of any software after a period of inactivity.

In some embodiments it the alarm signal may be transmitted from the electronic device to a remote location via a wireless signal. For example, if a child's mobile phone is taken or lost, the alarm may be transmitted to a third party device, for example belonging to one or more of the child's parents' mobile phone, instead of, or as well as, on the child's mobile phone or tablet. Ideally an alert message is sent to the third party device and may be an instant message, such as WhatsApp®™ alert message or an SMS alert message. In another embodiment an email may be sent to a nominated email address.

Preferably the sensor is configured to sense a severing of the cable and the processor transmits an alert signal in response thereto.

Optionally a rechargeable battery is connected to the wireless transmitter.

In another embodiment the alarm is trans-mitted from the wireless transmitter.

In this way, if an unauthorised disconnection of an electronic device is detected, either by removing the cable from the terminal or by interrupting a signal generated by the cable (when the cable is connected to the electronic device), such as by severing the cable, an alarm is initiated to alert the owner of the electronic device or another authorised person or organisation, who is responsible for the electronic device, so that action can be taken. The system can therefore be used to identify and reduce loss or theft of electronic devices by means of the alert acting as a warning to a user and/or a deterrent to a perpetrator.

The tamper alert is programmed by computer implemented software preferably in the form of application specific software (APP) provided on the device. The APP allows a user to authorise connection and disconnection of a cable, for example by inputting a code or biometric authorisation signal, thereby enabling the alarm to be selectively armed and disarmed. This may be important as it ensures that the alarm is not erroneously activated, for example by accidental disconnection of the cable.

Preferably the processor requires a confirmatory command signal, provided by an authorised user, in order to configure the alarm to a standby mode and to disable the alarm (s). For example, an owner or authorised user may have to acknowledge the disconnection or connection of the cable within a predefined time interval, thereby placing the alarm to a standby or quiescent mode until the disconnection or connection of the cable has been authorised. The confirmatory command signal may be, or may include a personal identity number (PIN) which is input into a key-pad or a code word may bespoken into a microphone or it may be biometric input, such as a fingerprint or it may be a combination of the aforesaid command signals.

Preferably the electronic device is a mobile communication device, such as a smartphone, a navigation device or a tablet. In this way portable items can be protected from loss or theft.

In some embodiments the processor in the electronic device is in communication with a second remote processor which operates in accordance with computer implemented software. In this way a remote device may be able to monitor the system. For example, the processor of the electronic device may communicate with a remote PC or second electronic device enabling the electronic device to be monitored remotely. This may be particularly advantageous in public spaces, shared households or workspaces, where a device may be unattended, for example whilst charging. Communication may be via a cable or wireless.

The alarm is intended to alert a user or responsible person of the loss or theft of a device. The alarm may be an audible alarm that is generated by a loudspeaker in the device, a haptic alarm that may begenerated by one or more vibrating elements in the device and/or a visual alert such as a light or image displayed on a screen. Visual alerts are ideally generated by one or more light emitting diodes (LEDs) in the device. A user may select their chosen alarms, or combination of alarms.

In some embodiments triggering the alarm may also activate an imager on the electronic device so that photograph or videos of a would be thief are automatically obtained. Preferably any images collected may automatically be sent to remote storage, for example to a 'cloud' storage facility, or to another remote device. In this way it may be possible to identify who has taken the electronic device from photographic evidence. It is appreciated that activation of an imager may be undertaken in silently or in a stealth mode.

It is appreciated that each alarm may have a selection of variations, for example the type of sound, such as a bell, siren or voice, the vibration sequence, for example constant or intermittent, or the type or number of lights or images displayed, for example constant of flashing lights.

Preferably a processor in the electronic device is operable in accordance with computer implemented software to present a menu on a display of the electronic device which present options to a user to select a particular alarm mode. Each mode may include a type, sequence and/or duration of alarm(s).

The cable is capable of carrying a current and the wireless transmitter becomes operable on receipt of a current through the cable upon connection of the cable to the device. In this way the wireless transmitter only sends a signal when the cable is connected.

In some embodiments the cable may include, or be connectable to, at least one rechargeable battery. For example, an embodiment of the invention including a sensor and/or wireless transmitter that may require a power supply may include a rechargeable battery that is separate to the battery(ies) of the electronic device.

In a preferred embodiment the at least one rechargeable battery that is associated with the cable may only be used if the power level of the electronic device falls below a pre-set level. For example, the rechargeable battery may be configured to be used if the power level of the electronic device falls to a level that is not sufficient to allow transmission of a signal from the sensor or wireless transmitter for a predefined time period and to enable the electronic device to remain operable for the same or similar predefined time period so that the alarm can be activated. In this way the rechargeable battery can be used to power the wireless transmitter, which may be formed integrally with the cable, to reduce power usage by the electronic device.

Additionally the rechargeable battery of the cable may provide a power source for the electronic device when a low power level is detected. This ensures that the tamper alert system has redundancy should the battery of the electronic device runs below a certain level, such as a level that is sufficient to transmit, or receive signals and maintain the ability to activate the alarm for a period of time that is longer than that of using the battery of the electronic device. In this embodiment it is intended that the battery is configured only to be used in the system if earlier signals (following connection to the electronic device) have been transmitted and therefore the battery only serves as a backup when there is insufficient or low level power available from the electronic device.

It is appreciated that in some embodiments the battery may be the main power supply for the wireless device. For example, wherein the wireless transmitter is not in direct connection with the electronic device and therefore cannot draw power from the electronic device, but is in a proximity within which signals can be transmitted from the wireless transmitter and received by the processor.

Or optionally, in systems including a cable, the rechargeable battery may power the wireless transmitter and provide power to the electronic device. Again this may maintain the system if the battery level of the electronic device is low.

According to a third aspect of the invention a tamper alert system for an electronic device comprises: a sensor in the device which is operable to communicate with a processor and in accordance with computer implemented software; a battery, which may be a rechargeable battery, is connected to a wireless transmitter, whereby when a confirmatory signal is received by the processor from the wireless transmitter, an alarm is configured to a standby mode when in stand by mode the sensor senses an unauthorised interruption of a signal from the wireless transmitter, the processor transmits an alert signal, indicating an unauthorised event, to the alarm which activates the alarm.

In this way the tamper alert system is also able to operate without a physical connection to the electronic device.

The wireless transmitter may serve as a second means for indicating connection of the cable to the device, for example as an alternative to a sensor detecting presence of the plug in the terminal, the sensor may instead, or as well as, detect a signal from the wireless transmitter when the wireless transmitter receives a power supply from the electronic device.

The wireless transmitter may be in the form of a radio frequency (RF) transmitter operating in accordance with Bluetooth®™ protocol.

It is appreciated that the tamper alert system is intended to operate with all electronic devices. In devices that do not allow for cable connection status to be shared with applications the device may rely on the wireless transmitter, that is activated upon connection of the cable to the electronic device, to send signals that are detected by the sensor.

When an unauthorised disconnection of the cable, interruption of a signal from or through the cable is detected is activated an alarm is triggered to advise of the unauthorised disconnection of the electronic device which prevents the sensor communicating with the processor and thereby activates the alarm.

It is appreciated that the activation of the alarm may be triggered in various different ways depending upon the type of electronic device and features of the cable.

For example, the alarm may be triggered by unauthorised disconnection of the plug from the terminal wherein the terminal has a sensor that detects connection/disconnection, or the alarm may be triggered by severing of the cable wherein a signal passing along the cable is interrupted and thus not detected by the sensor, or the alarm may be triggered when a signal transmitted from a transmitter such as a Bluetooth®™ module on the cable is not received by the sensor.

In this way unauthorised disconnection can be detected in different ways to accommodate different electronic devices and/or to provide multiple mays to monitor connection for enhanced security.

In preferred embodiments the cable is a standard electrical cable that is capable of carrying an electric current.

Preferably the cable includes a tether or anchor for securing the cable to a person or an item. In this way the cable and thereby the device can optionally be secured to a user or to an item. Therefore an attempt to remove the electronic device will result in disconnection of the cable from the device whilst the tether/anchor remains connected to the person or to the item. This provides an additional security feature to the system.

Typically the tether/anchor is provided at the opposite end of the cable to the plug that is received by the terminal. Ideally the cable is of sufficient length to permit standard use of the device that is no compromised by the presence of the cable. For example, the cable may be long enough to allow the anchor to be secure in the pocket of a coat and the electronic device to be rem oved and operated without the cable being placed under tension that may lead to disconnection.

In preferred embodiments the tether or anchor includes a closed loop for securing about a person or an item such as an item of clothing, a bag or a table. Ideally the size of the closed loop is adjustable, for example by a friction connector, in order to easily accommodate different people and items.

In some embodiments the anchor/tether may include a mechanism for securing the anchor/tether to a person or item. For example, the mechanism may include a catch, hook, lanyard or ferromagnetic engagement means.

The mechanism may include a lock to prevent disconnection of the anchor or tether. For example, the tether may be locked to a bag so that detachment of the electrical device from the cable and therefore separation from the bag indicates loss or theft.

The lock may also be used to fix the closed loop in a position that cannot then narrow or widen under urging so that it does not become overly tight or loose around a user or an item.

In some embodiments a second plug may be provided at an opposed end (second end) of the cable, typically at an end that includes the tether or anchor.

The second plug enables the cable to be connected to another device and/or to a power supply. For example, the cable may be connected to a battery pack at the second end and to the electronic device at the first end.

It is appreciated that the system may be adapted to monitor connection of one, both or either of the first or second plugs, so that disconnection of any may trigger and alarm. Ideally the user selects which plug(s) to be monitored.

For tamper alert systems with two or more plugs, it is appreciated that at least one sensor may monitor connection to each plug and that a different signal may be transmitted from the, or each, sensor so that the processor can distinguish between disconnection of a particular plug. Different alerts may be associated with disconnection of each plug.

It is appreciated that the cable may be provided with different plugs for difference uses. For example, the plug may be a universal serial bus (USB) or Apple Lightning®™ plug. In some embodiments the plug may be adapted to accommodate various plug, for example by providing an adaptor or being capable of receiving an adaptor.

In yet a further embodiment the cable may include more than one plug at each end of the cable to permit connection to different devices separately or simultaneously. For example one end of the cable may include a plug for receipt in a charging socket and a plug forreceiptin an earphone jack.

In an embodiment including a wireless transmitter that includes a plug for connection to a charging means, it is appreciated that the power source may be used to power the wireless transmitter, rather than drawing power from the battery in the electronic device.

It is also appreciated that the wireless transmitter may be arranged within a plug casing or jack, for example a plug which connects to a power socket, so that the cable appears to be a standard charging cable.

In some embodiments, upon activation of an alarm, the electronic device is configured to transmit signals at intervals to indicate geolocation of the device so as to track the device. In this way once an unauthorised disconnection is detected, the location of the device is automatically tracked. For example, the alarm signal provided by the processor may simultaneously activate geo-tracking on the device. Geolocation tracking may be a form of stealth tracking by which the person with the electronic device can be tracked but is unaware that the alarm of the tamper alert system is active.

In yet a further embodiment the alarm signal generated by the processor may also generate a signal that locks the electronic device in order to prevent access whilst the device is considered lost or stolen.

According to a further aspect of the invention a tamper alert device is adapted to connect to an electronic device and comprises: a cable with a plug for connecting to a terminal of the device, a sensor is formed integrally with and is connected to the cable and is operable to communicate with a wireless transmitter which transmits an alarm signal when an unauthorised disconnection of the plug is sensed.

Optionally a motion sensor in the electronic device detects an unauthorised movement of the device. The motion sensor monitors movement of the device, and if movement above a pre-set level is detected, the motion sensor sends a signal to the processor to activate the alarm.

The motion sensor may also be used to trigger the alarm if the device is unexpectedly moved whilst the tamper alert system is armed, for example when a mobile telephone is moved whilst being charged. The user may be able to configure the tamper alert system to indicate that movement is not expected. For example when the electronic device is being charged, or when the electronic device is arranged in a location from which no movement is expected. Such a scenario may arise when placing the electronic device on another high value item or device, such as a laptop. In this way, if the electronic device is moved, when configured to the mode in which no movement is expected, should movement be detected by the motion sensor, the alarm is automatically placed in an activated state by the processor. Also, in this way, if the electronic device is attempted to be switched off in an attempt to deactivate the alarm, for example during an attempted theft, the mode may be configured to detect unexpected movement of the device and cause the alarm to activate.

In yet a further embodiment the tamper alert system may include a case for the electronic device that inhibits a power off button(s) so that it is not possible to switch off the device without removing the case. Alternatively muting of buttons is prevented so that an audio alarm cannot be silenced. This is an additional security feature that renders it more difficult for someone attempting to steal a device to disable the tamper alert system by turning off the device.

It is appreciated that the computer implemented software may be programmed to prevent switch off when the system is in armed or standby mode.

Preferred operation of the system may include the following options and steps:

- Installation of the application on an electronic item such as a smartphone or tablet
- Connection of a cable to the electronic device
- Acknowledging connection of the cable through the application to set the alarm to standby mode (PIN/password/biometric entry etc.)

The application may include the options for devices to be named and preferred settings, such as alarm options to be saved.

It is further appreciated that different signals may be transmitted upon detection of different types of information by the sensor(s). For example, a first signal may be sent to the processor to indicate connection of a cable by a terminal on the electronic device. A second signal may be received from a wireless transmitter that is transmitting repeated signals to be received by the processor.

By providing different signals the system can distinguish between each. This may allow and different alerts to be provided for each. For example, the alert may be different for different devices as the sensor used to communicate with each device may be different.

Optionally an override option is provided to disarm the alarm, for example, when the device is recovered.

In yet a further embodiment the tamper alert system may be adapted for use with an inductive charging system wherein cessation of charging due to moving the electronic device away from the charging platform will trigger the alert. In such embodiments the sensor may monitor proximity of the device to the charging platform. For example, the electronic device may monitor proximity to the charging platform, possibly using the same proximity parameters that permits charging. If the pre-defined proximity of the electronic device to the charging platform is exceeded the alert is activated. In this embodiment the sensor is preferably a proximity sensor that communicates with the inductive charging device.

It is appreciated that the application may be programmed to prevent the electronic device from being turned off, or muted when in an armed status so that it is not possible for an unauthorised person to disable the alarm.

Preferred embodiments of the invention will now be described, by way of examples only, and with general reference to the Figures and specific reference to FIGS. 2 to 5 in which:

DETAILED DESCRIPTION OF FIGURES

Figure 1:
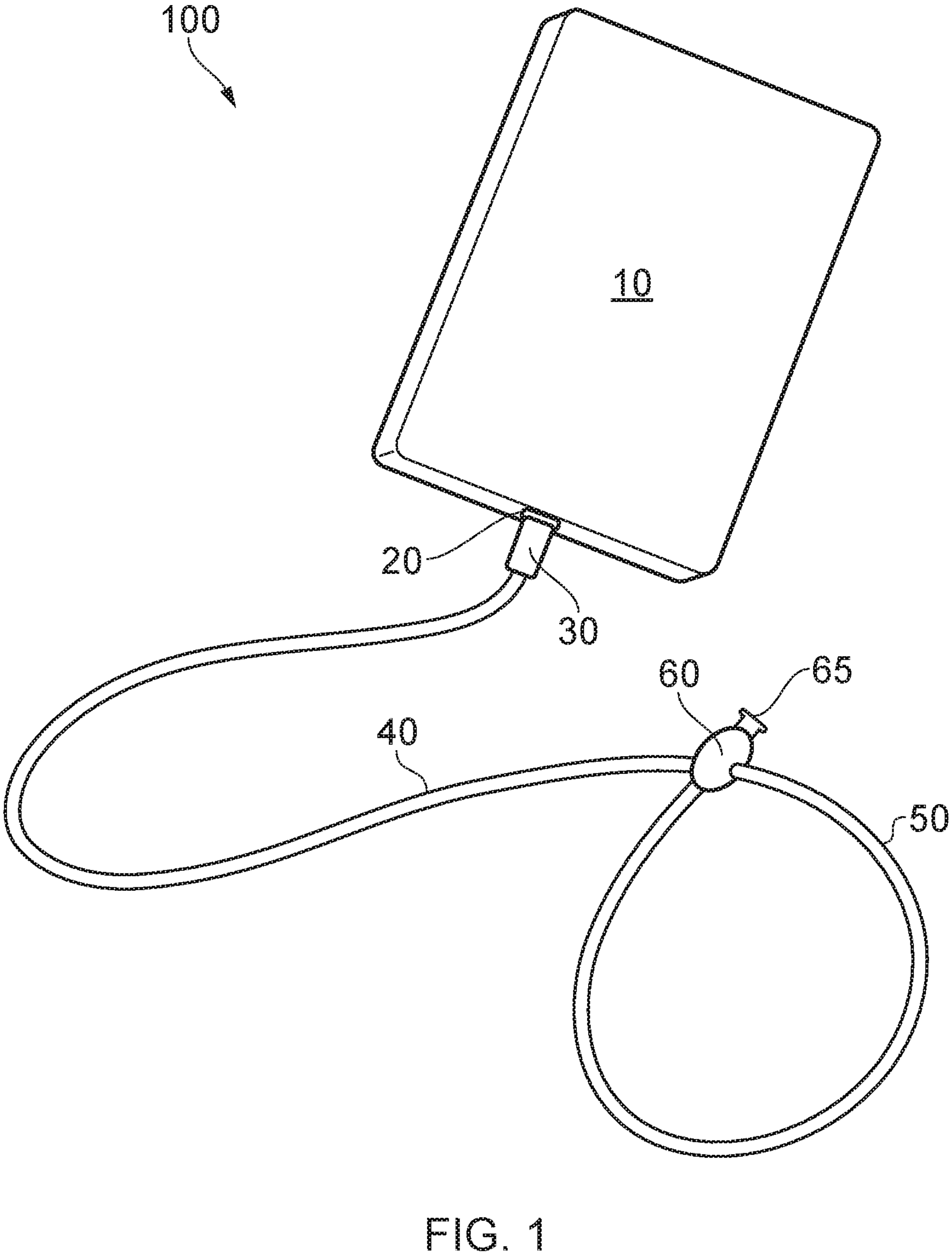
FIG. 1 shows an overall view of an electronic device connected to a cable.
Figure 2:
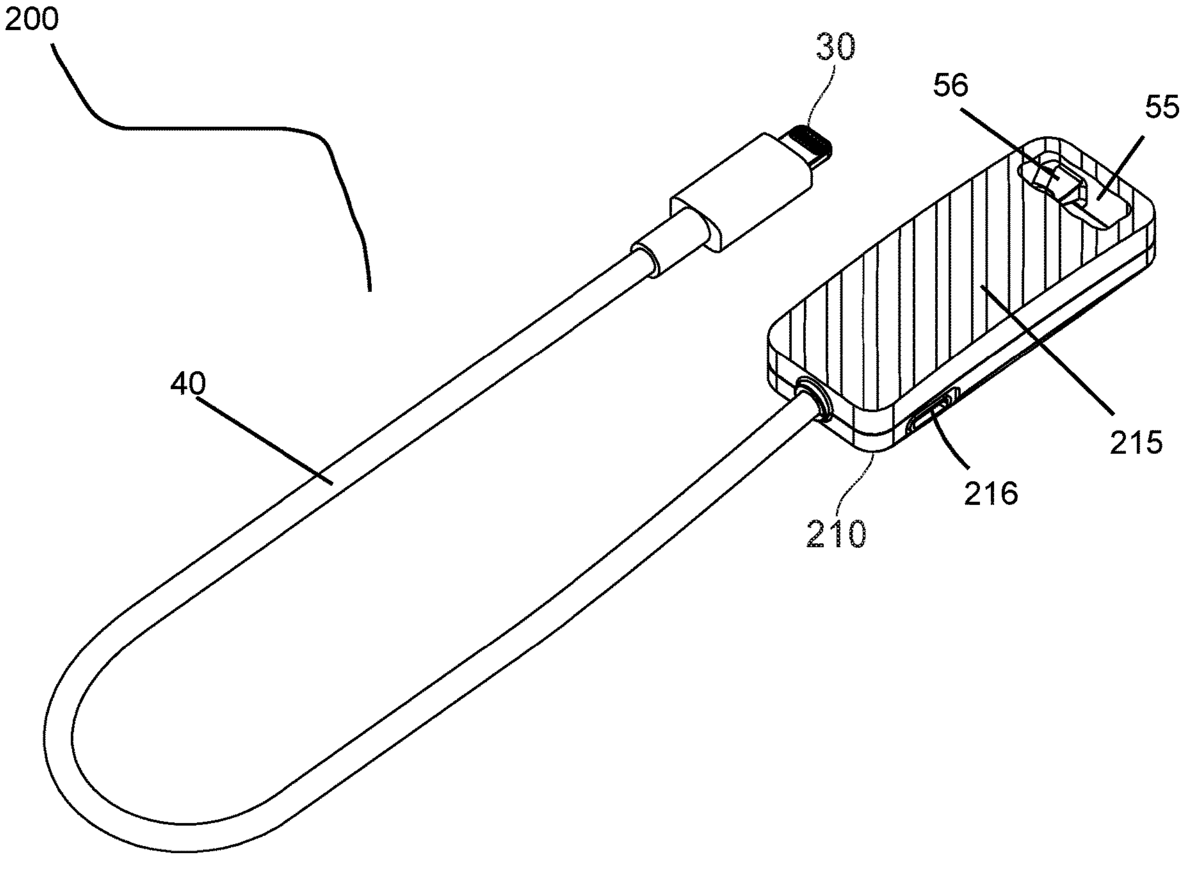
FIG. 2 shows an isometric view of an embodiment of the system.
Figure 3:
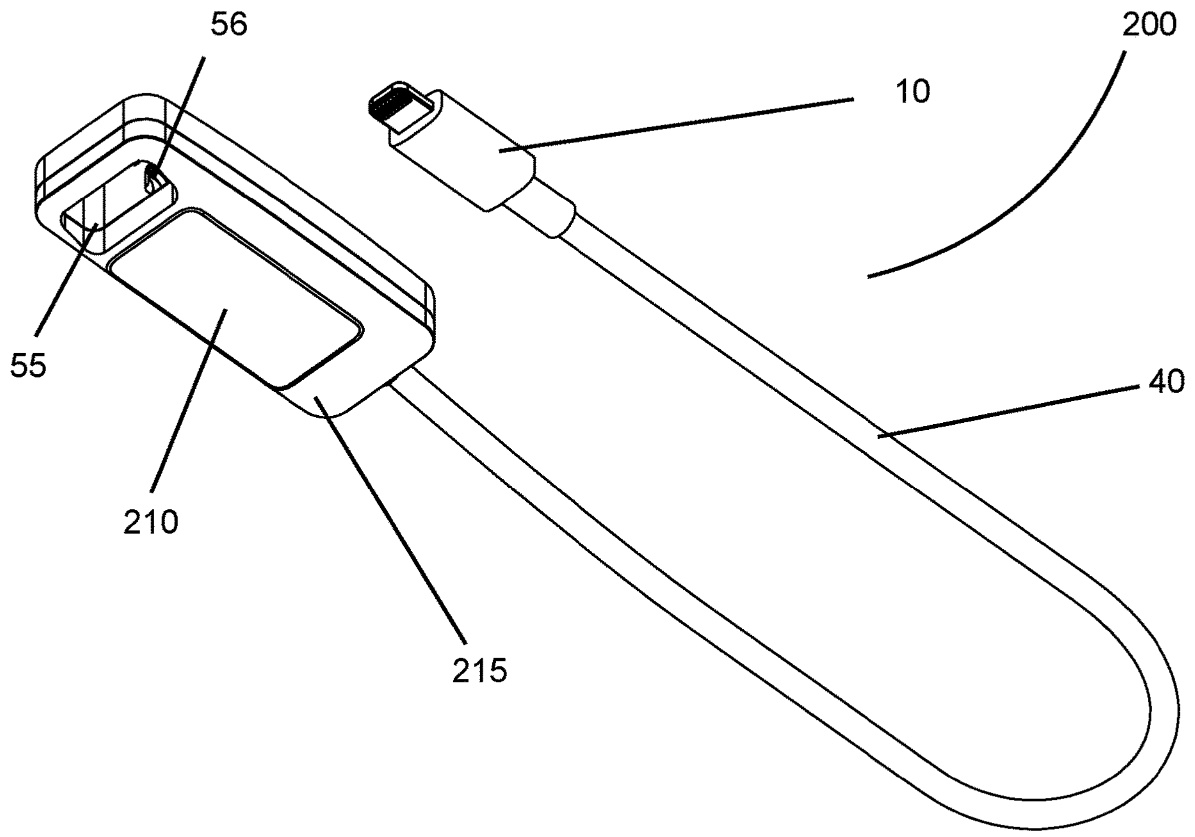
FIG. 3 shows a reverse isometric view of the embodiment in FIG. 2.
Figure 4:
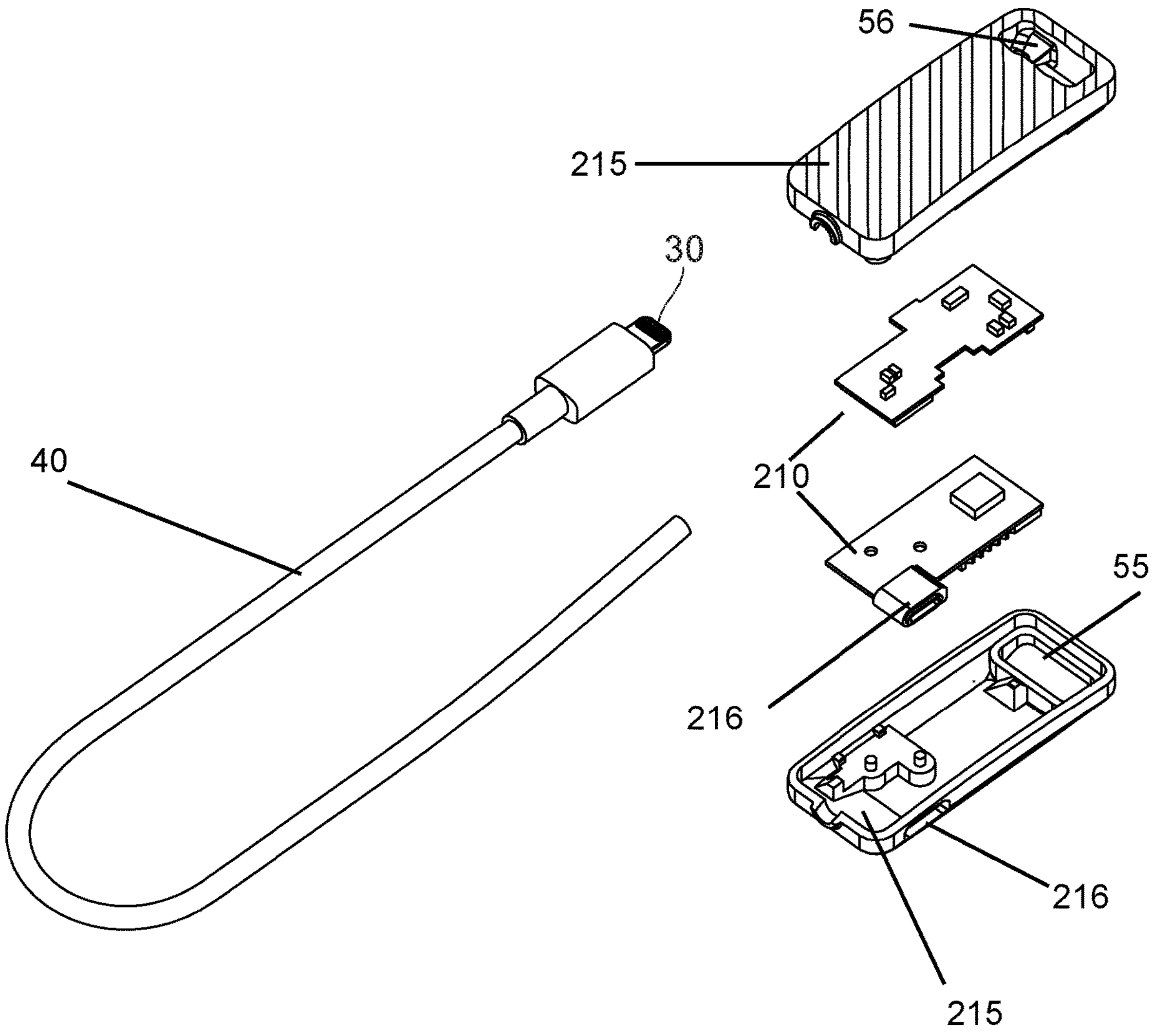
FIG. 4 shows an exploded isometric view of the embodiment in FIG. 2.
Figure 5:
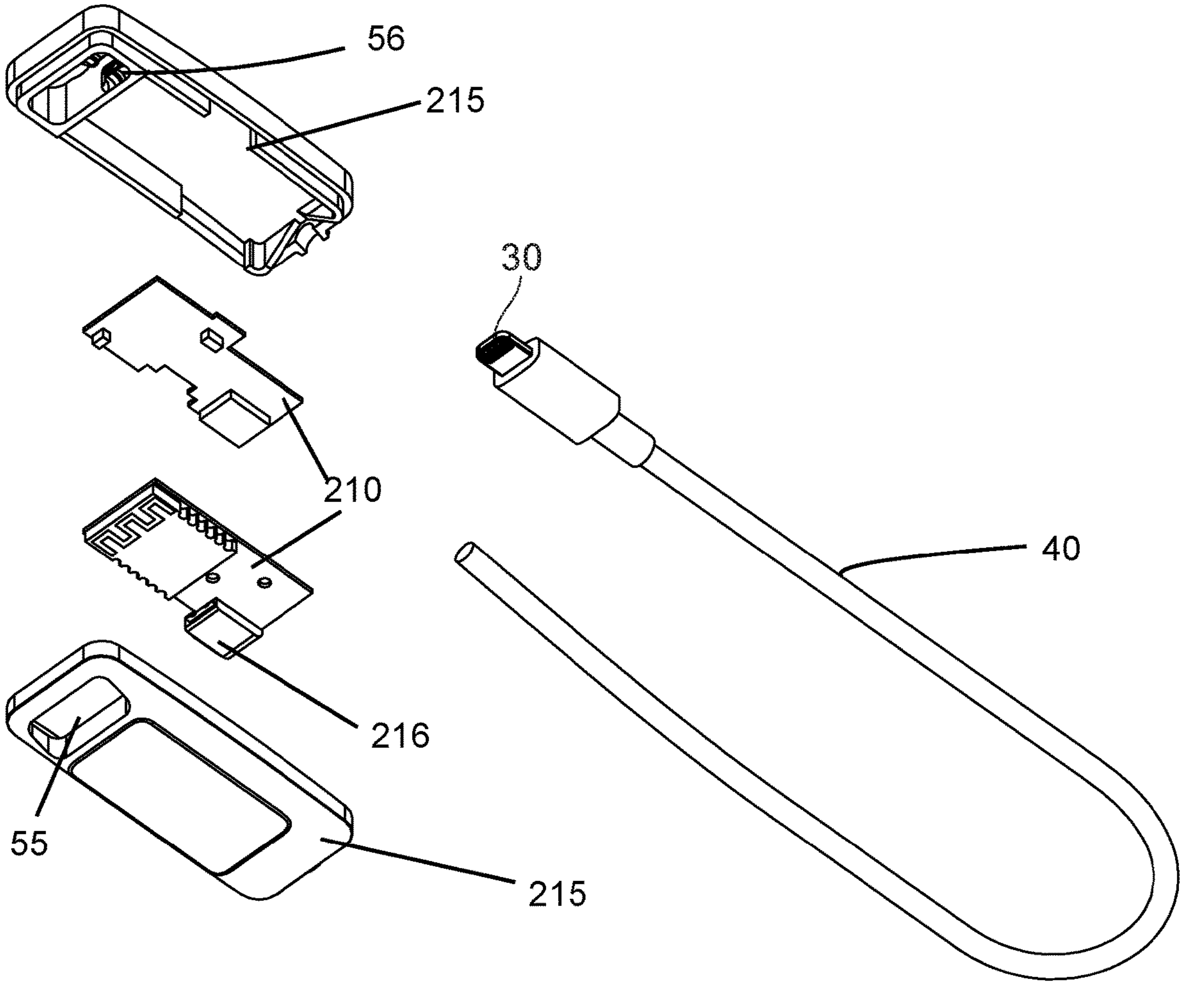
FIG. 5 shows a reverse exploded isometric view of the embodiment in FIG. 2.

With reference to FIG. 1 there is shown an example of a mobile phone 10 connected to a cable 40 for reference and illustrative purposes.

The device 10 has a terminal 20 that receives a plug 30 at a first end of the cable 40. At a second end of the cable 40 there is an anchor. The anchor is formed by a loop 50 by means of a connector 60 and a spring lock 65. The connector 60 permits adjustment of the size of the loop 50.

FIGS. 2 to 5 show an embodiment of the tamper alert system 200 which has a wireless transmitter 210 arranged at a second end of the cable 40. In this embodiment 200 the cable 40, which carries an electric current, has a wireless transmitter 210 in the form of a Bluetooth®™ transceiver that is arranged at a second end of the cable 40 and housed in a housing 215. A first end of the cable has a plug 30.

The housing 215 also provides an anchor to enable formation of the cable 40 into a loop 50 by way of aperture 55 whish is formed in the housing 215. The aperture 55 is sized to permit the cable 40 and plug 30 to pass therethrough in order to form a loop 50. The aperture 55 has a cable grip 56 for locking the cable 40 in position.

The housing 215 also includes a socket 216 for receiving a second plug (not shown) of a charging device (not shown) to permit connection to a mains power supply or battery (not shown) or battery pack (not shown). In this way the housing 215 and cable 40 of the tamper alert system 200 may be part of a charging pathway for charging the mobile phone 10 or other device to which the tamper alert system 200 is connected.

When the cable 40 is connected to the mobile device 10 the wireless transmitter 210 receives electric current from a battery (not shown) within the mobile device 10. In operation a wireless signal, from the wireless transmitter 210 is transmitted to a receiver in the device 10 and processed by a processor (not shown) in the device 10.

Continual receipt of the wireless signal affirms connection of the tamper alert system 200 to the mobile device 10. Any disruption to the signal indicates disconnection or rem oval of the tamper alert system 200. Therefore a separate sensor to detect connection through the terminal 20 of the mobile device is not required.

Figure 6:
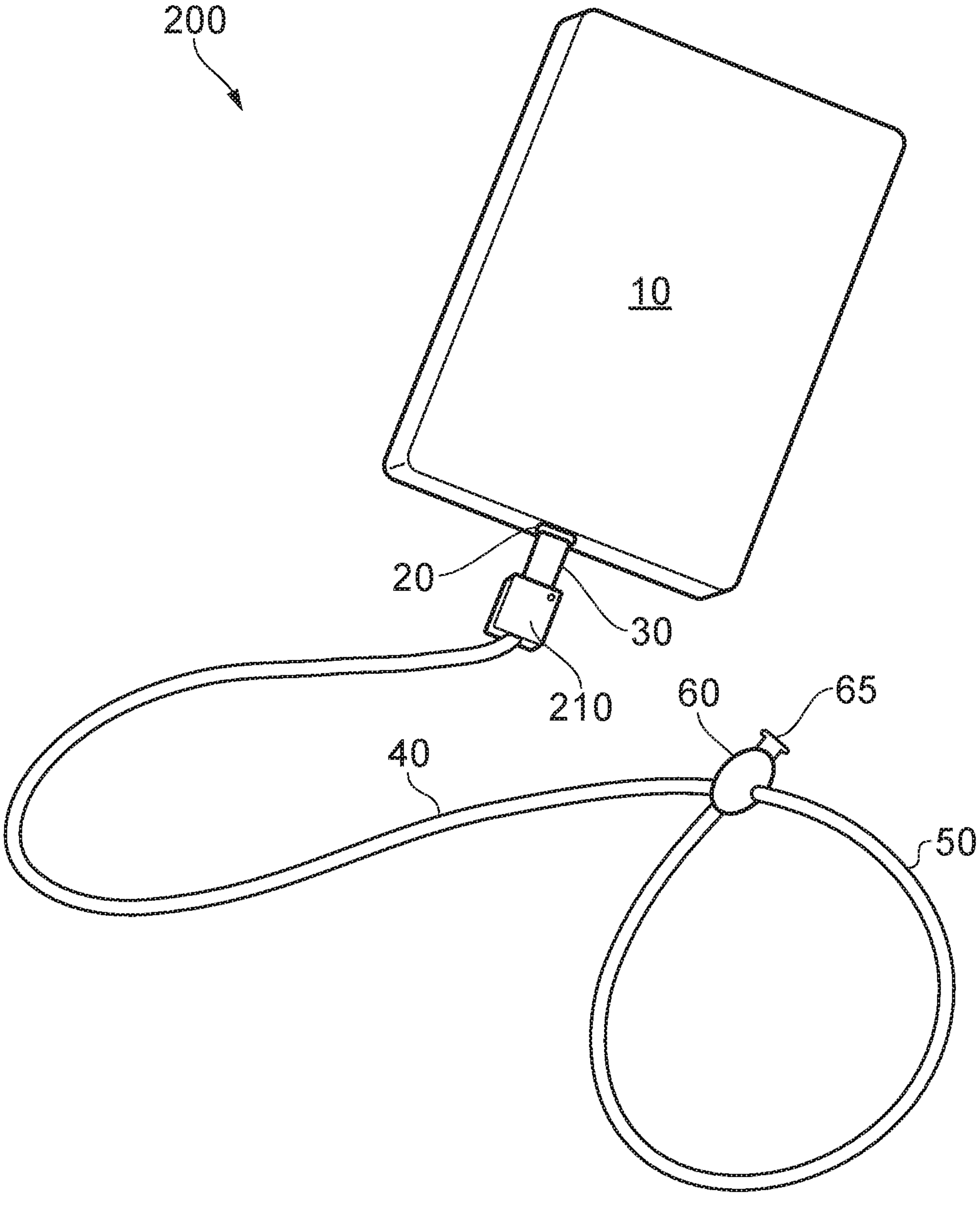
FIG. 6 shows a second embodiment of the system, having a wireless transmitter provided on the cable.

FIG. 6 shows another embodiment of the system 300. Like parts have like reference numerals. In this embodiment 300 the wireless transmitter 210 (in the form of a Bluetooth®™ transceiver) is provided at a first end of the cable 40 which is close to the end of the cable 40 which where the plug 30 is provided. The Bluetooth®™ transceiver 210 is therefore combined in the housing 215 with the plug 30 attached thereto.

In some embodiments, if the electronic device 10 has a low battery level, for example that is insufficient to operate the electronic device 10 and the wireless transmitter 210, a back-up or ancillary battery (not shown) can be connected to the wireless transmitter 210 to maintain transmission of signals from the wireless transmitter 210.

Preferably any such back-up or ancillary battery (not shown) is configured only to be used if an active repeating signal ceases due to low battery in the electronic device 10 and/or when the battery level of the electronic device 10, is detected as being below a predetermined level. This ensures that the tamper alert system 200 remains operable. For the avoidance of doubt such a back-up or ancillary battery is not intended to be the main power source for the electronic device 10.

In use cable 40 is connected to an electronic device 10 and the electronic device 10 needs to be configured to standby mode. This is usually carried out after suitable software, such as contained in application specific software (an APP), has been loaded into memory and for use on the electronic device 10.

Figure 7:
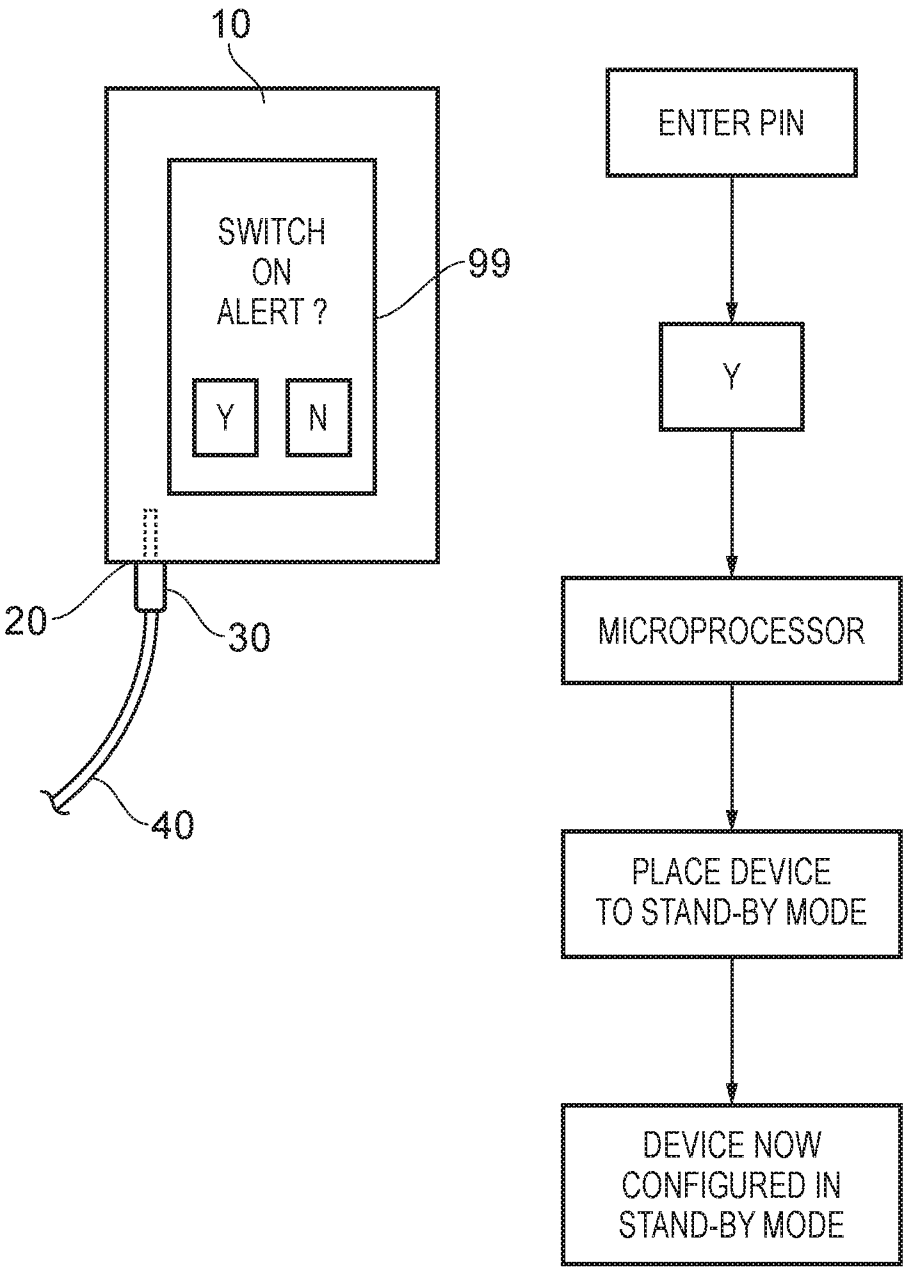
FIG. 7 shows a flow diagram of a process for initiating the system.
Figure 8:
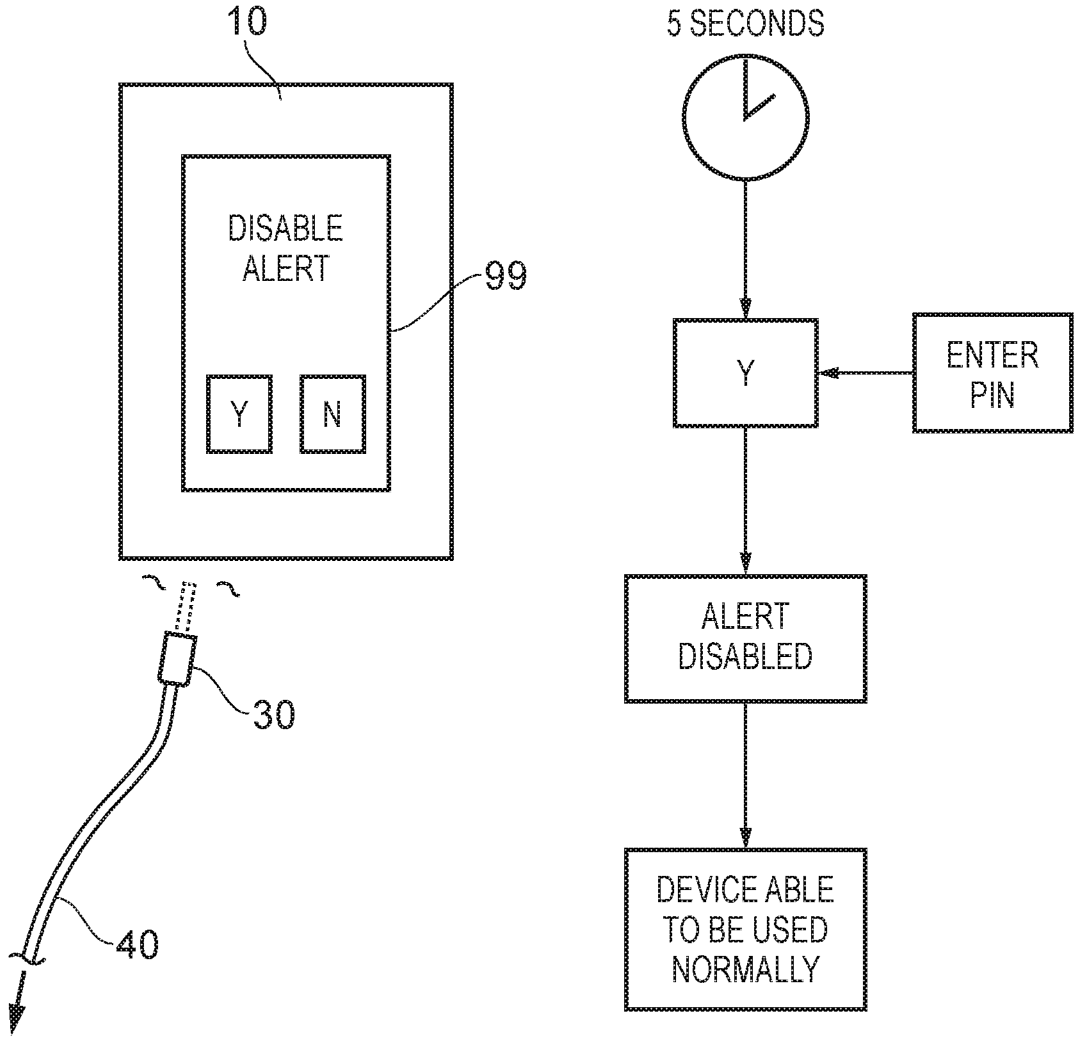
FIG. 8 shows a flow diagram of a process to disable the alarm by an authorised user.
Figure 9:
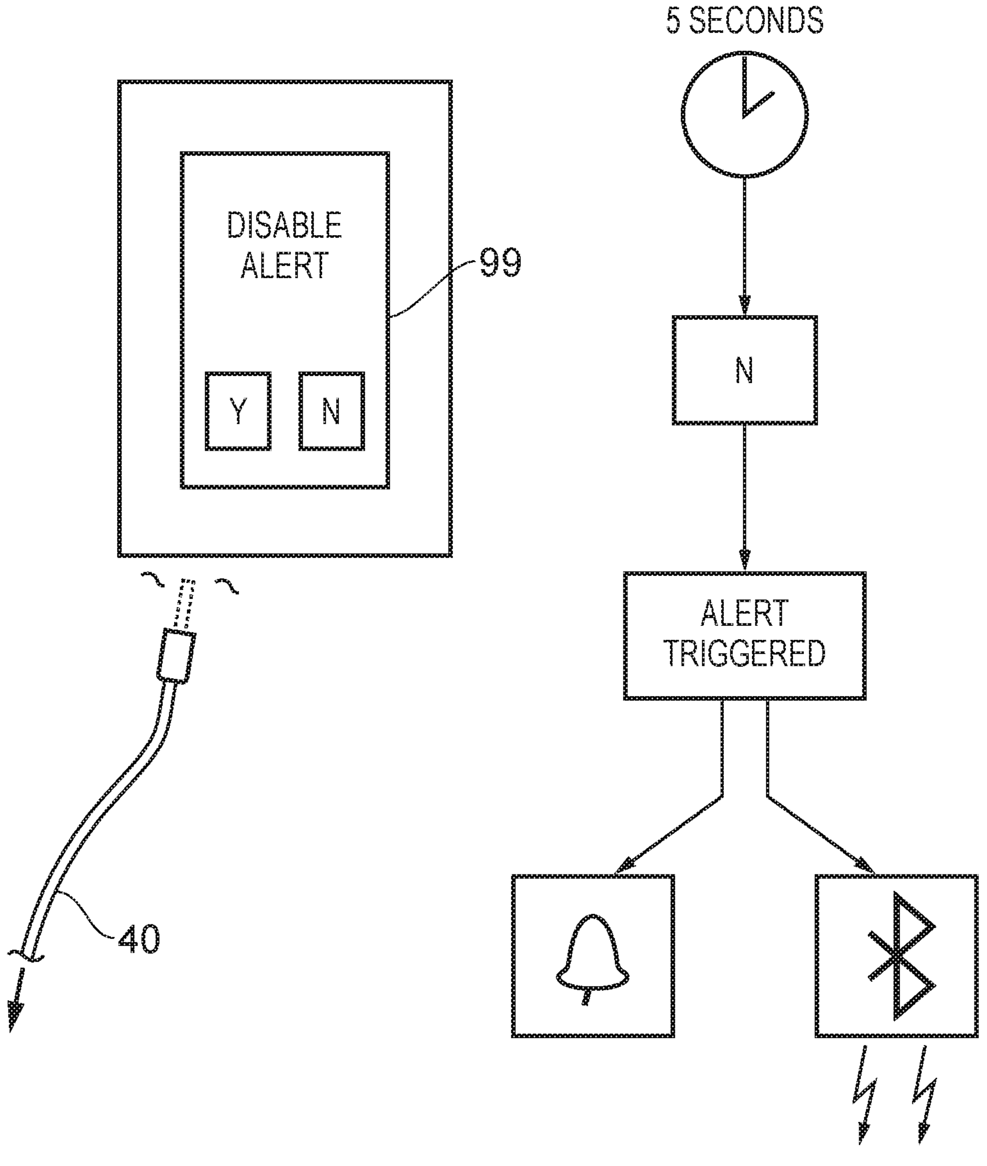
FIG. 9 shows a flow diagram representing the process of activating the alarm.

FIGS. 7 to 9 show examples of processes of the system where like parts have the same references.

In FIG. 7 the cable 40 is shown connected to the device 10 by the terminal 20. Connection of the cable 40 initiates an authentication step whereby detection of the connection by a sensor (not shown) prom pts the user, by means of the APP, to enter a Personal Identification Code (PIN) before the option to switch on (Y) or to not switch on (N) the alert is provided.

The flow diagram shows the selection of 'Y' to place the alarm in standby mode. Once 'Y' is selected a microprocessor (not shown) places the alarm on the device to a standby status or in standby mode, so that if the sensor no longer detects the connection between the transmitter 210 and the electronic device 10, this is interpreted as an event that will automatically activate the alarm.

FIG. 8 shows an example, depicted in a flow diagram, of the tamper alert system 200 in operation during unintentional disconnection or malicious severing of the cable 40. On detection of a disruption of signal event, a menu option to set or disable the alarm is presented on display 99 of the electronic device 10. This menu provides the user an opportunity to disarm the alarm if the disconnection was intentional. Typically a 5 second timeframe enables the user to authorise the deactivation of the alarm by entering a PIN. Failure to enter the PIN in this time frame leads to automatic activation of the alarm after seconds.

Alternative time frames may be specified. Likewise the APP may provide the user with a 'blank screen option', so that the display 99 which may be switched on by selected buttons, so as not to alert a thief because in some embodiments no audible alarm is activated at the electronic device 10 and instead a signal is sent to another device or location.

In FIG. 8 disconnection of the cable 40 is authorised as intentional by inputting the correct PIN. Selection to deactivate the alarm is then made thereby stopping the alarm being activated although the cable 40 has been disconnected. The device 10 can continue to be used normally.

FIG. 9 shows the system process of an unauthorised disconnection of cable 40, when the option to deactivate the standby mode is not selected in time. The absence of an authorisation within 5 seconds to disable the standby mode results in the transmission of a 'No' signal from the processor thereby leading to automatic activation of alerts in the form of an alarm and a Bluetooth®™ signal to a remote device. Alternatively a WhatsApp®™ alert message or an SMS alert message is sent to a third party.

Figure 10:
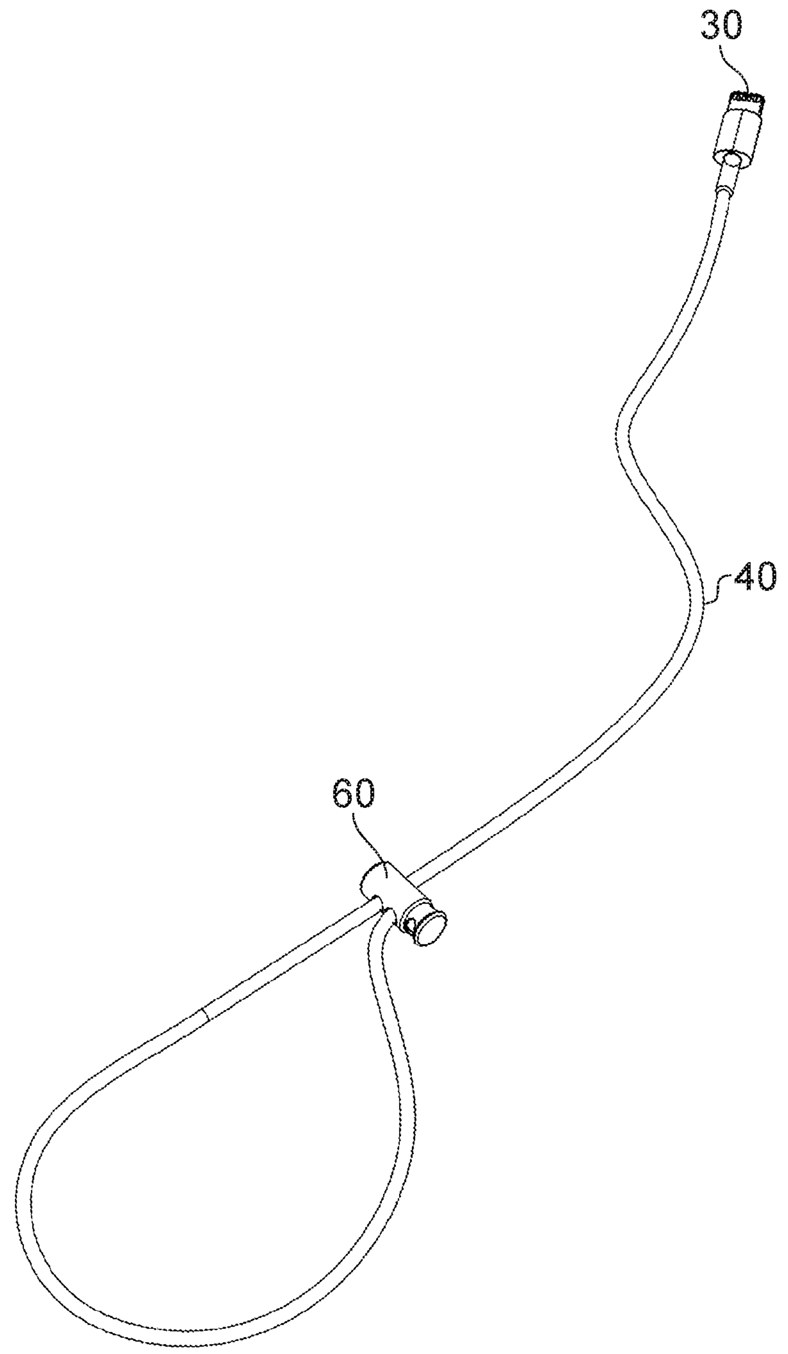
FIGS. 10 and 11 show views of another embodiment of the cable.
Figure 11:
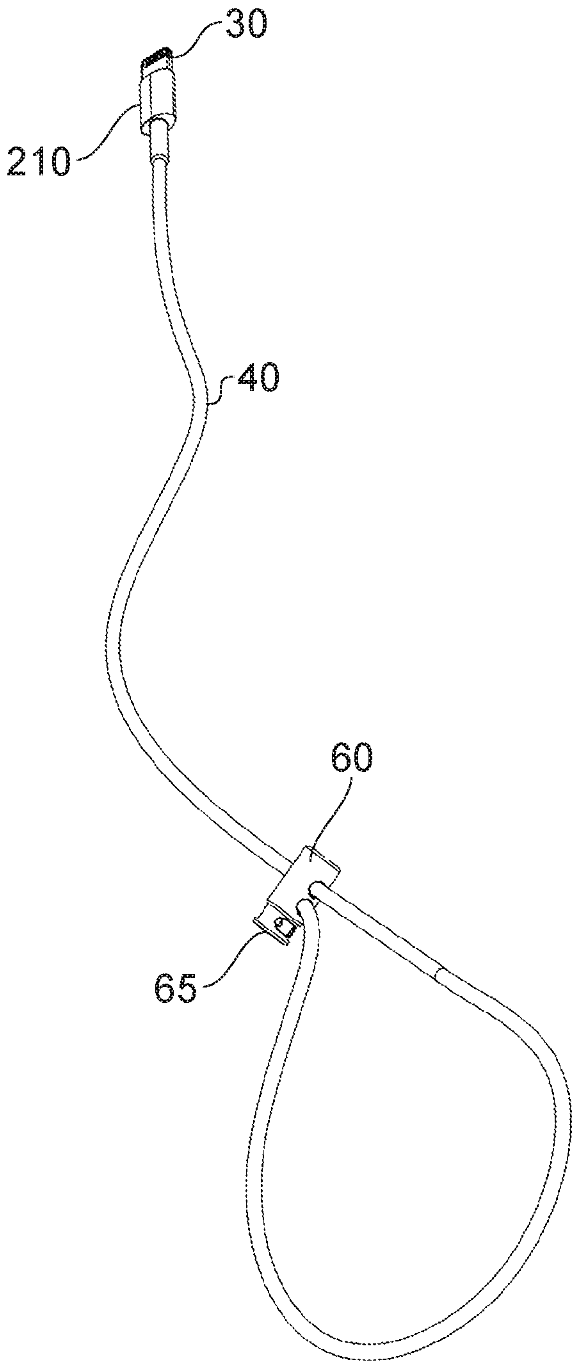
Figure 12:
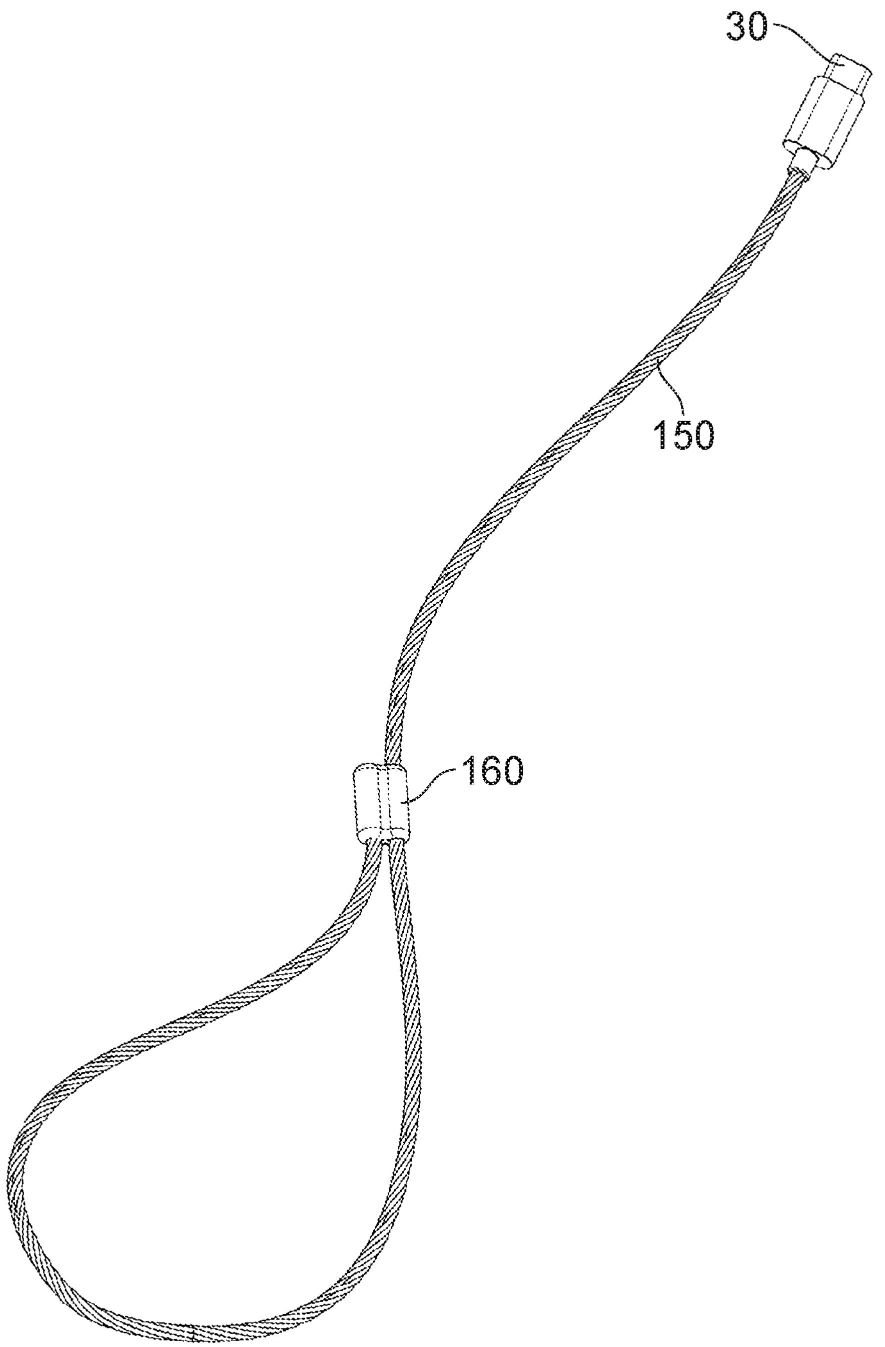
FIGS. 12 and 13 show views of an embodiment of a tether.
Figure 13:
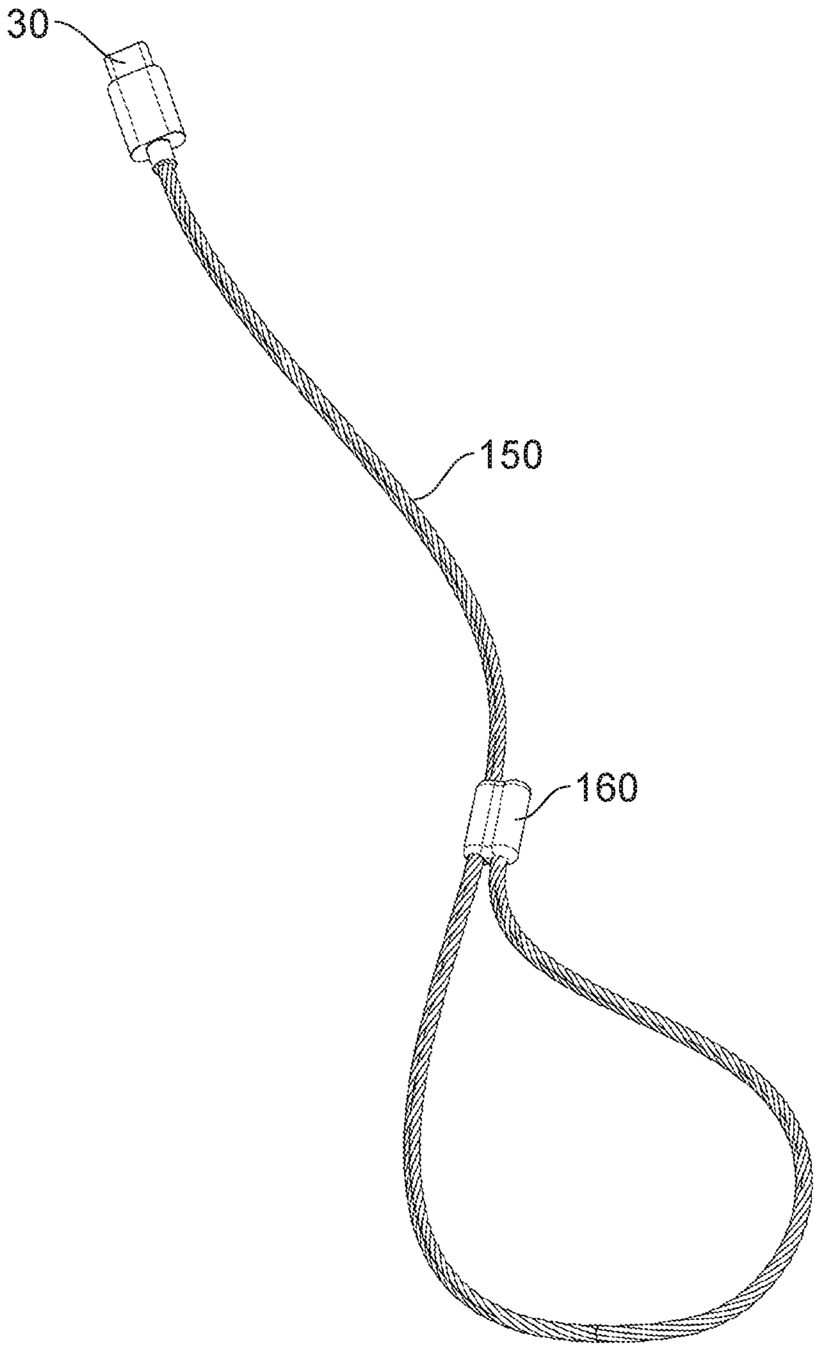

FIGS. 10 and 11 show examples of different types of cable with spring locks 65 that may be used with the system 200. FIGS. 12 and 13 show examples of different tethers 150 an friction connectors 160 that may be used with the system 200. When no lateral force is applied to the friction connector 160 it may be envisaged that the friction connector is relatively free to slide on the tether 150, so that changes in closed loop diameter are easily and swiftly accomplished, even with one hand and during use.

Variation may be made to the invention, for example the tamper alert system may be modified to include a panic button when depressed for a predefined interval alerts one or more members of a group or relays or sends a message to one or m ore nominated mobile devices. For example, the panic button may be configured to send a distress message to one or more nominated recipients.

The invention has been described by way of examples only and it will be appreciated that variation may be made to the above-mentioned embodiments without departing from the scope of invention as defined by the claims.

The invention claimed is:

1. A tamper alert system for an electronic device comprising:

a cable with a plug for connecting to a terminal of the electronic device and a wireless transmitter connected to the cable, the wireless transmitter being operative to send a signal to a processor in the electronic device and in accordance with computer implemented software, the processor determines when an authorised connection of the plug is made to the terminal and configures an alarm to a standby mode in response thereto;

whereby when the alarm is in the standby mode and the electronic device detects an unauthorised interruption of the signal from the wireless transmitter, the processor in the electronic device transmits an alert signal, indicating an unauthorised event, to activate an alarm.

2. The tamper alert system according to claim 1 wherein the electronic device is configured to sense a severing of the cable and the processor transmits the alert signal in response thereto.

3. The tamper alert system according to claim 1 wherein a battery, which is preferably a rechargeable battery, is connected to the wireless transmitter.

4. The tamper alert system according to claim 3 wherein the alarm is transmitted from the wireless transmitter.

5. The tamper alert system according to claim 1 wherein the alarm is an audible alarm that is generated by a loudspeaker in the electronic device.

6. The tamper alert system according to claim 1 wherein the alarm is a haptic alarm that is generated by one or more vibrating elements in the electronic device.

7. The tamper alert system according to claim 1 wherein the alarm is a visual alert, generated by one or more light emitting diodes (LEDs) in the electronic device.

8. The tamper alert system according to claim 1 whereby, when the alarm is configured in the standby mode, the processor is operative to present a menu on a display of the electronic device, the menu presenting a choice of input options to a user to select at least one of: an audible alarm and/or a visual alarm and/or a haptic alarm.

9. The tamper alert system according to claim 8 in which the menu presents an option to input a third party mobile telephone number, to where an alert message is sent, and when selected, configures the processor to transmit the alert message which is from a group comprising an instant message, a WhatsApp®™ alert message and an SMS alert message.

10. The tamper alert system according to claim 1 wherein the processor is operable to communicate with a remote second processor, via a communication channel, the second processor operating in accordance with computer implemented software and is operative to send an email message to a nominated email address.

11. The tamper alert system according to claim 1 wherein the electronic device is a mobile communication device comprising a smart phone or tablet.

12. The tamper alert system according to claim 1 wherein the cable includes a tether or anchor for securing the cable to a person or an item.

13. The tamper alert system according to claim 12 wherein the tether or anchor includes a closed loop.

14. The tamper alert system according to claim 13 wherein the size of the closed loop is adjustable by way of a lock means.

15. The tamper alert system according to claim 1 wherein the wireless transmitter is configured to transmit signals, when in the standby mode, at a predefined interval to a remote receiver which derives an indication of a geolocation of the electronic device to which the wireless transmitter is connected.

16. The tamper alert system according to claim 1 wherein the wireless transmitter is formed integrally with the cable.

17. The tamper alert system according to claim 1 whereby a confirmatory command input is required to disable and/or reconfigure the alarm, once triggered, to return it to the standby mode.

18. The tamper alert system according to claim 17 whereby the confirmatory command input is a personal identity number (PIN) which is input to a key-pad of the electronic device or a code word is spoken into a microphone of the electronic device.

19. The tamper alert system according to claim 1 includes a panic button which when depressed for a preset time relays or sends a message to one or more nominated mobile devices.

20. The tamper alert system according to claim 1 whereby a motion sensor in the electronic device sends a trigger signal to the processor to place it in an active state to activate the alarm.

* * * * *